United States Patent [19]
Taylor et al.

[11] Patent Number: 5,493,126
[45] Date of Patent: Feb. 20, 1996

[54] LWIR-TRANSMITTING WINDOWS

[75] Inventors: Christopher Taylor, Redondo Beach; Michael Borden, Santa Monica, both of Calif.

[73] Assignee: Hughes Aircraft Company, Los Angeles, Calif.

[21] Appl. No.: 395,018

[22] Filed: Feb. 27, 1995

[51] Int. Cl.$^6$ .................................................. G01J 1/00
[52] U.S. Cl. ................................. 250/504 R; 250/505.1
[58] Field of Search ........................... 250/338.1, 504 R, 250/505.1; 359/350, 359, 360

[56] References Cited

U.S. PATENT DOCUMENTS

| | | | |
|---|---|---|---|
| 4,128,448 | 12/1978 | Bitterice et al. | 156/166 |
| 4,980,564 | 12/1990 | Steelmon | 250/505.1 |
| 5,357,726 | 10/1994 | Effenberger et al. | 52/309.7 |

*Primary Examiner*—Bruce C. Anderson
*Attorney, Agent, or Firm*—Georgann S. Grunebach; Wanda K. Denson-Low

[57] ABSTRACT

A composite LWIR-transmitting window (10) comprising a thin sheet of LWIR-transmitting plastic film (11) reinforced by integration with an open mesh screen (12) of fine, thin or flat metal or fibrous filaments (14, 15). The preferred plastic film is polyethylene having a maximum thickness of about 0.03", most preferably less than about 0.02". The screen (12) comprises filaments such as woven wires or fibers or formed structures of thin metal, such as flat wires of honeycomb-type meshes which are thicker in the direction perpendicular to the plastic film to maximize reinforcement while minimizing blockage of LWIR through the open mesh areas (13).

11 Claims, 3 Drawing Sheets

LWIR-TRANSMITTING WINDOWS

BACKGROUND OF THE INVENTION

The present invention relates to windows for infrared radiation or heat detection devices capable of use as LWIR emitters and/or as remote detectors of surface temperature patterns, capable of imaging-temperature variations. Such devices are well known for a variety of purposes, such as night vision enhancement, heated body detection, thermal imaging and related uses. The plastic windows of the present invention may be used in a wide variety of vision enhancement systems (VES) such as for automotive surveillance purposes.

More specifically, the present invention relates to novel composite window materials for LWIR emission and/or detection devices. Conventional window materials such as glass and other common visible-region optical materials are useless for the present purposes because they absorb LWIR nearly completely and thereby block or prevent it from entering LWIR-sensing devices and from being transmitted by LWIR-emitting devices.

Thin films of certain synthetic thermoplastic polymers, namely polyolefins such as polyethylene, are known to transmit longwave infrared radiation in the 8 to 12 micron bandwidth. However, such films only can have a maximum thickness no greater than about 0.030", more preferably no greater than about 0.020", since films in greater thicknesses absorb LWIR to too great an extent to be useful for the present purposes. Thus, polyethylene films capable of transmitting LWIR must be so thin as to be unsuitable for practical use as protective windows for infrared imaging or detection devices as low cost alternatives for conventional antireflection-coated zinc sulfide and germanium-type ceramic windows.

SUMMARY OF THE INVENTION

The present invention relates to the discovery that thin polyolefin film having a maximum thickness of about 0.03" can be modified to form practical LWIR-transmissive protective windows for devices which transmit and/or receive LWIR by reinforcing the polyolefin film with a fine honeycomb, mesh or screen of filaments such as metal or fiber wires or partitions which are embedded partially or completely within the polyolefin film to form a reinforced composite window having the strength of the honeycomb, mesh or screen and having the LWIR-transmissive properties of the polyolefin film in the mesh or screen-opening areas.

THE DRAWING

In the accompanying drawing FIG. 1 is a schematic illustration of a composite polyethylene film/metal mesh window according to the present invention;

FIG. 2 is a graph illustrating the IR-transmission properties of polyethylene sheets of different thicknesses, and FIG. 3 is a graph illustrating the IR-transmission properties of a composite polyethylene/metal mesh window produced according to the present invention.

DETAILED DESCRIPTION

Figure 1:
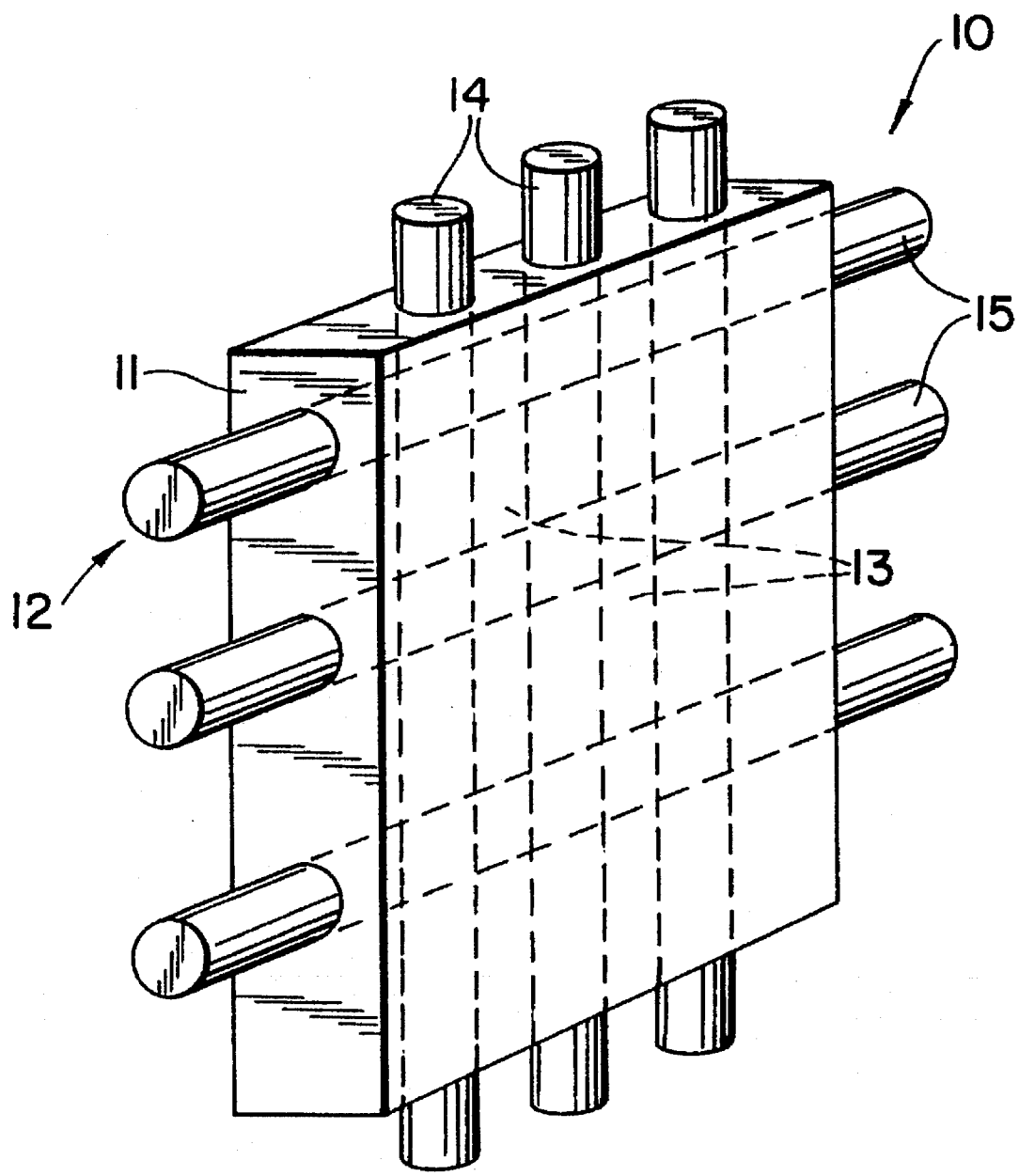

Referring to the drawings, FIG. 1 thereof illustrates a composite LWIR-transmissive window 10 according to an embodiment of the present invention in which a thin polyolefin film 11, such as of polyethylene, has a fine wire mesh screen 12 embedded therein to form a reinforced composite comprising a plurality of polyolefin windows in the open mesh areas 13 framed by and reinforced by vertical wires 14 and the horizontal wires 15 of the screen 11.

The composite 10 of FIG. 1 is produced by laying a fine screen 12 on a casting surface, or over a thin film of polyethylene, and casting and curing a thin layer 11 of polyethylene thereover to encapsulate the screen 12, or by extruding the polyethylene film 11 and thereafter heat-embedding the screen 12, or by melt-extruding one or two polyethylene films onto a web of fine screen and passing the composite between compression rolls, or by other suitable processes which will be apparent to those skilled in the art.

Since the total thickness of the polyolefin film 11 can be no greater than about 0.03", the wire screens 12 suitable for use according to the present invention can have a gauge or wire diameter no greater than about 0.02", if the wire screen is to be embedded as shown in FIG. 1.

Preferably the screen mesh, or number of openings 13 per linear inch, is small, e.g., 10 or less, to maximize open mesh or window area.

According to another embodiment of the invention, the wire screen 12 is only partially embedded into one surface of the thin polyethylene film 11 or sheet to form the reinforced composite. This may be accomplished by laying the wire screen over the thin polyethylene film or sheet and applying heat and pressure to integrate the screen into the film sufficiently to form a composite having good strength and LWIR-transmission properties. According to this embodiment the wire gauge or diameter may be up to about 0.04", or a deep mesh or honeycomb of thin flat metal or plastic may be used to maximize reinforcement while minimizing blockage of LWIR. However, the film thickness can be no greater than about 0.03", as in the first embodiment, since greater thicknesses block the passage of LWIR. The thin filaments such as metal can be made with greater depth or width, such as a honeycomb-type or other structure having thin flat metal or plastic partition walls, to improve strength and stiffness without reducing transmission. The ends of the thin partition walls are integrated with a surface of the plastic film and the thin walls and honeycomb passages extend perpendicular to the film to provide an open LWIR-transmitting honeycomb-mesh. Obviously, the reinforcement partition or wire 14, 15 framing each open mesh window 13 of polyethylene also blocks the passage of long wave infrared radiation but sufficient LWIR passes through the multiplicity of said open window areas 13 so that the overall requirements of strength and LWIR transmission are satisfied, particularly in the case of thin flat partitions or wires 14, 15. Such blockage is reduced if the wires or partitions are thin in the direction perpendicular to the plastic film surface.

Figure 2:
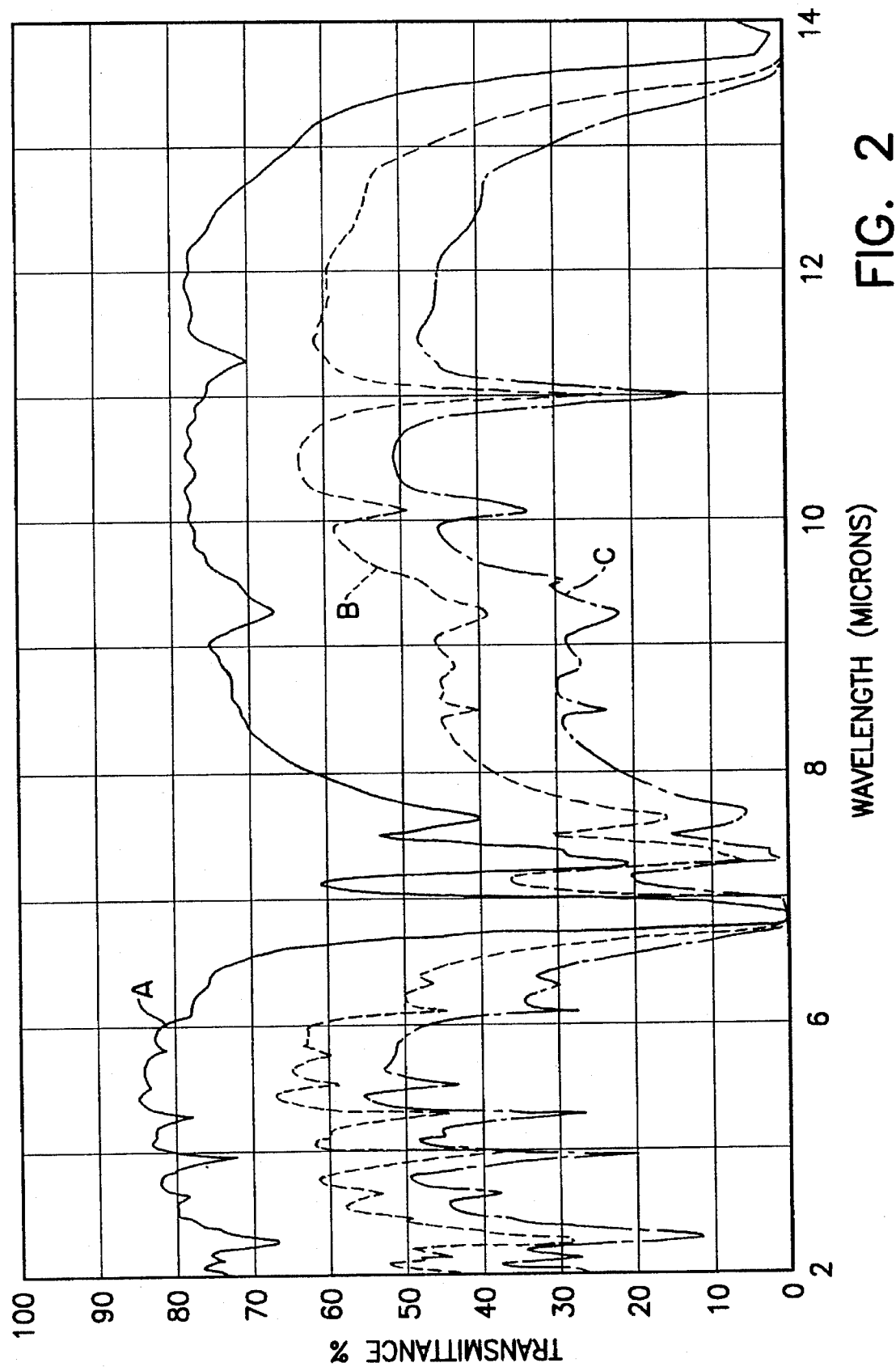

As illustrated by the graph of FIG. 2 of the drawing, the % transmittance of infrared radiation by polyethylene sheets varies with the wavelength of the infrared radiation and the thickness of the polyethylene sheets, line A illustrating a sheet 0.006" thick, line B illustrating a sheet 0.017" thick and line C illustrating a sheet 0.030" thick.

Longwave infrared radiation (LWIR) has a wavelength between about 8 to 12 microns. As illustrated by FIG. 2, the thinnest polyethylene film, represented by line A, transmits between about 60% and 78% of the LWIR, whereas the 0.017" thick film represented by line B transmits between about 40% and 63% of the LWIR, and the 0.030" thick film of line C transmits between about 20% and 50% of the LWIR. All of the films represented by lines A, B and C are satisfactory for use according to the present invention. The thinner films are preferred for their superior LWIR-transmissive properties.

Figure 3:
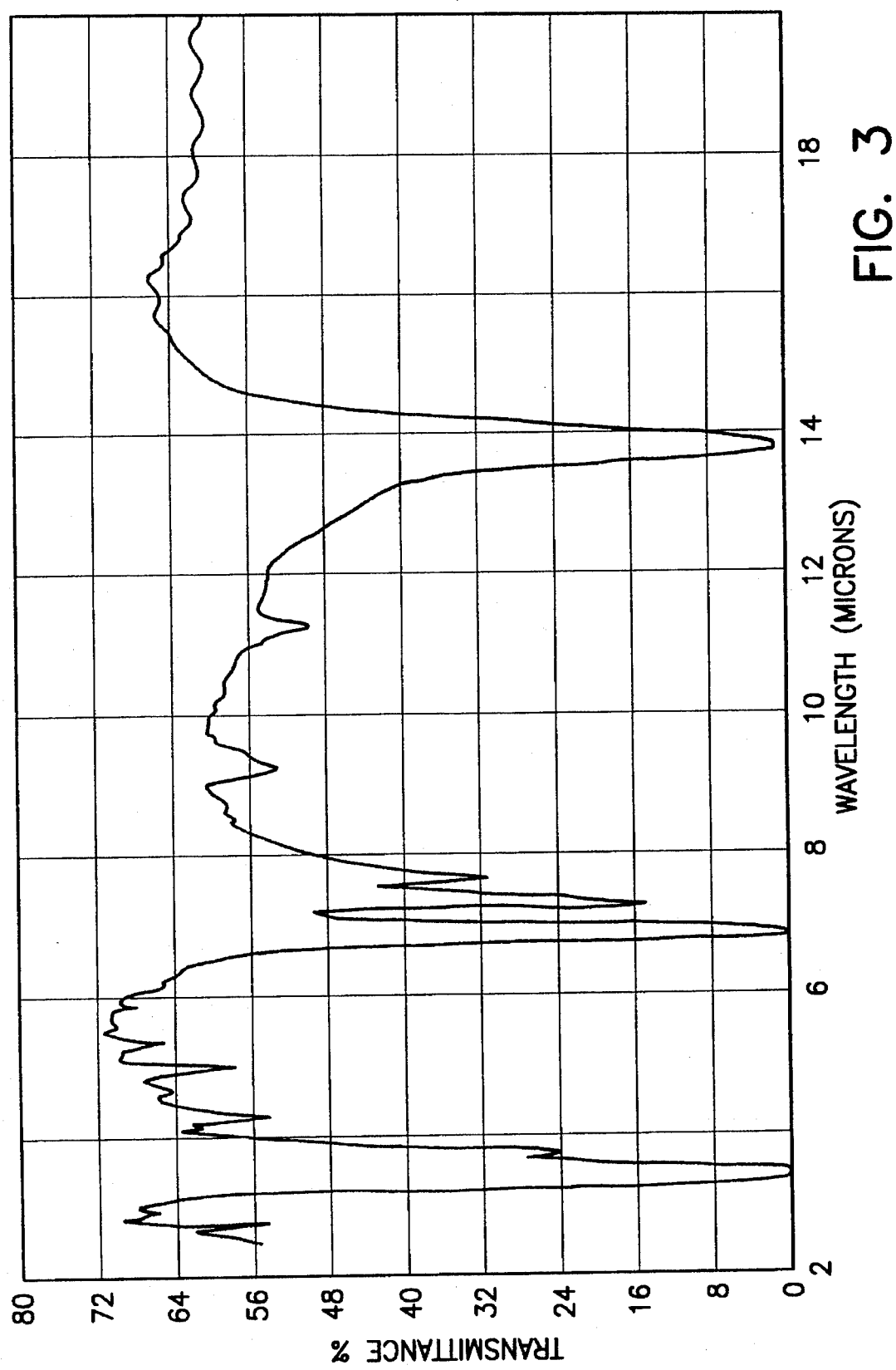

A suitable screen-reinforced LWIR-transmissive composite window is produced according to the present invention by heat-bonding a suitable fine-wire or heat-resistant fiber screen to one surface of a 0.006" thick sheet of polyethylene film to partially-embed or integrate the metal screen with the film. The screen of FIG. 1 comprises a uniform metal mesh of rounded copper wire having a gauge or diameter of 0.007" on 0.050" spacings. FIG. 3 of the drawing illustrates the IR-transmissive properties thereof, most particularly the LWIR-transmissive properties, within the 8–12 micron bandpass. As illustrated, the composite window transmits between about 50% and 60% of the LWIR, to average about 55% transmission.

It will be apparent to those skilled in the art that improvements in material and mesh designs aimed directly at producing high 8–12 micron transmission composite windows can improve the transmission to above 80% in this bandpass. Although this transmission performance may not be quite as high as the alternative coated ceramic windows, there is a substantial cost savings in materials and manufacturing, which helps to make infrared systems more affordable for implementation in a wide range of automotive and commercial applications.

The cost of the present composite windows is considerably lower than any ceramic-based alternative. Metal meshes are routinely produced for applications ranging from window screens to electromagnetic interference screens. The mesh used to produce the present composite windows can be obtained for much less than 50 cents for a 3" by 6" piece. Polyethylene can be produced extremely cheaply. The present composite windows also can be produced by laminating a metal or fibrous mesh between two sheets of polyethylene, each less than about 0.015" in thickness, or by injection or blow-molding the thin plastic film partially or completely around a fixed metal or fibrous mesh. Fibrous screens are well known, such as woven or otherwise formed from strong glass fibers, ceramic fibers, carbon fibers or synthetic polymer fibers. The term "filament" is used herein to include metal and fiber wires and partitions.

The novel composite windows of the present invention are not only economical alternatives to higher cost IR-transmitting windows such as conventional zinc sulfide or germanium-type ceramics. They have the added advantage of not requiring the application of antireflective coatings, as must be used on high refractive index ceramics to prevent loss or reduction in LWIR transmission through reflection. Thus, the present composite windows are ideal low cost alternatives to a zinc sulfide window for the external window of the vision enhancement system (VES) for automobiles or surveillance imaging applications. One of the main impediments to the commercial acceptance of a vision enhancement system is the relatively high cost thereof. Plastics are potential mirror substrates for this system to meet low cost requirements. The use of the present reinforced mesh/plastic composite windows for the VES system provides a baseline window significantly cheaper than current alternatives and sufficiently stiff and strong to protect the sensors and related electronic components housed within the device against water and other external contaminants which may impact the window during use.

While a composite window as illustrated by FIG. 1 of the drawing has two smooth surfaces which are easier to clean than a composite window in which the screen is only partially embedded, the latter embodiment enables the manufacture of a window with a grid of wires or fibers which is thicker than the plastic film, while still providing environmental protection. The mesh does reduce the transmission by obscuration. However, stiff meshes with at least 74% transmission are available. Furthermore, alternative meshes with higher transmissions from optimized wire or fiber diameter, thickness, and spacings, and made from stiffer materials can be fabricated to improve the performance to the present composite windows.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed:

1. A composite window capable of transmitting a substantial percentage of infrared radiation having a wavelength within the range of 8 to 12 microns (LWIR), comprising a thin LWIR-transmitting plastic film having a maximum thickness of about 0.03" integrated with an open-mesh screen of thin filaments.

2. A composite window according to claim 1 in which said LWIR-transmitting plastic film is polyethylene.

3. A composite window according to claim 2 in which said polyethylene film has a thickness of about 0.006".

4. A composite window according to claim 1 in which said filaments are thinner than said sheet of plastic film and are completely embedded therewithin.

5. A composite window according to claim 4 in which said filaments comprise thin metal wire.

6. A composite window according to claim 1 in which said filaments are thicker than said sheet of plastic film and are integrated with a surface of said thin plastic film.

7. A composite window according to claim 6 in which said filaments comprise metal partitions.

8. A composite window according to claim 7 in which said partitions comprise flat wire filaments having a greater thickness in the direction perpendicular to the sheet of plastic film and providing an open LWIR-transmitting mesh.

9. A composite window according to claim 6 in which said screen comprises a honeycomb-structure having filaments comprising thin metal partitions integrated with a surface of said plastic film and providing an open honeycomb LWIR-transmitting mesh.

10. A LWIR-transmitting device comprising a housing having a composite window capable of transmitting a substantial percentage of infrared radiation having a wavelength within the range of 8 to 12 microns (LWIR), said window comprising a thin LWIR-transmitting plastic film having a maximum thickness of about 0.03" integrated with and reinforced by an open-mesh screen of thin filaments.

11. A device according to claim 10 in which said filaments comprise thin metal wire.

* * * * *